April 28, 1970  G. B. MUNSEY  3,508,485
THERMOSTATICALLY CONTROLLED COOKING APPARATUS
Filed July 2, 1968  2 Sheets-Sheet 1

INVENTOR,
GEORGE B. MUNSEY
BY Watson, Cole, Grindle & Watson
ATTORNEYS

April 28, 1970 G. B. MUNSEY 3,508,485
THERMOSTATICALLY CONTROLLED COOKING APPARATUS
Filed July 2, 1968 2 Sheets-Sheet 2

INVENTOR
GEORGE B. MUNSEY
BY Watson, Cole, Grindle & Watson
ATTORNEYS

United States Patent Office 3,508,485
Patented Apr. 28, 1970

3,508,485
THERMOSTATICALLY CONTROLLED COOKING APPARATUS
George B. Munsey, Little Rock, Ark., assignor to Munsey Products, Inc., Little Rock, Ark., a corporation of Arkansas
Filed July 2, 1968, Ser. No. 742,049
Int. Cl. A47j *37/12*
U.S. Cl. 99—331        8 Claims

ABSTRACT OF THE DISCLOSURE

Cooking apparatus including a receptacle having a cylindrical wall and a horizontal bottom and within which is disposed an electrical heating element controlled by a manually adjustable thermostatic switch. The switch is shielded from the heating element by a housing of heat conductive material, and has a contact surface in engagement over a substantial area with the heat conductive bottom of a container supported in the receptacle. A horizontal flange on the container supports it on the receptacle wall and substantially isolates the receptacle interior from the atmosphere. The rotary regulating shaft for the thermostatic switch extends concentrically downwardly through the bottom of the receptacle and has affixed thereto a radial arm projecting to the outer periphery of the bottom for cooperation with temperature calibrations on the cylindrical wall of the receptacle adjacent to the bottom.

---

This invention relates to improvements in cooking apparatus of the type which is adapted for use either as a deep fat frier or as a cooking kettle or pot, and in which the operating temperature of the electric heating element is controlled by a thermostatic switch.

In such apparatus, it is manifestly desirable to control the thermostatic switch in response to the temperature of the food bowl or container rather than of the thermostatic element itself. To achieve this end, in some instances the heating unit itself has heretofore been welded or otherwise permanently affixed in conductive relation directly to the bottom of the bowl or container for the food or cooking oil or fat and a control remote from the heating element has been employed for controlling the temperature. Such prior apparatus has been difficult to clean properly, due to the inseparable relation between the container and the electrical components. In those instances where the apparatus has been adapted for immersion in water for cleaning, the resulting apparatus has been inordinately expensive to produce and sell.

It is accordingly a primary object of the present invention to provide cooking apparatus of the afore-mentioned type in which the food or fat container is readily separable from the electrical components to facilitate easy cleaning and, nevertheless, is capable of removable assembly with such components in a manner to render the thermostatic switch directly responsive to changes in temperature of the container while divorcing it from direct response to changes in temperature of the heating element, despite the geographic proximity of the latter.

In particular, the arrangement is such that the thermostatic switch is enclosed within a housing of conductive material arranged to substantially isolate it from changes in temperature of the surrounding heating element. The housing is provided with an upwardly presented contact surface adapted for heat conductive engagement over a substantial area with the bottom of the container, the heat exchanging relationship between the container and housing thus being such that the temperature of the housing will correspond rather closely to that of the container bottom. Since the housing substantially encompasses the thermostatic switch, the heat radiated from the housing to the switch will control the action of the switch.

In accordance with the invention, it is desirable that the bottom of the container and the marginal supporting flange thereon, be vertically spaced apart a distance such that they will simultaneously engage the upper edge of the receptacle within which the heating element is housed and the contact surface of the switch housing respectively. With this arrangement, the supporting flange for the container prevents the escape from the receptacle of convection air currents such as might cause instability of the temperature within the receptacle.

In the preferred embodiment, the rotary regulating shaft for the thermostatic switch depends concentrically through the circular bottom of the receptacle and beneath the bottom carries a radial control arm which moves in an arc adjacent suitable temperature calibrations disposed on the outer cylindrical wall of the receptacle adjacent to the bottom.

The foregoing, as well as other incidental features and advantages, will become apparent from consideration of the following detailed description, together with the accompanying drawings of the preferred embodiment of the invention, in which:

DESCRIPTION OF DRAWING

The preferred embodiment of the invention is illustrated in the accompanying drawings, in which.

DETAILED DESCRIPTION

Figure 1:
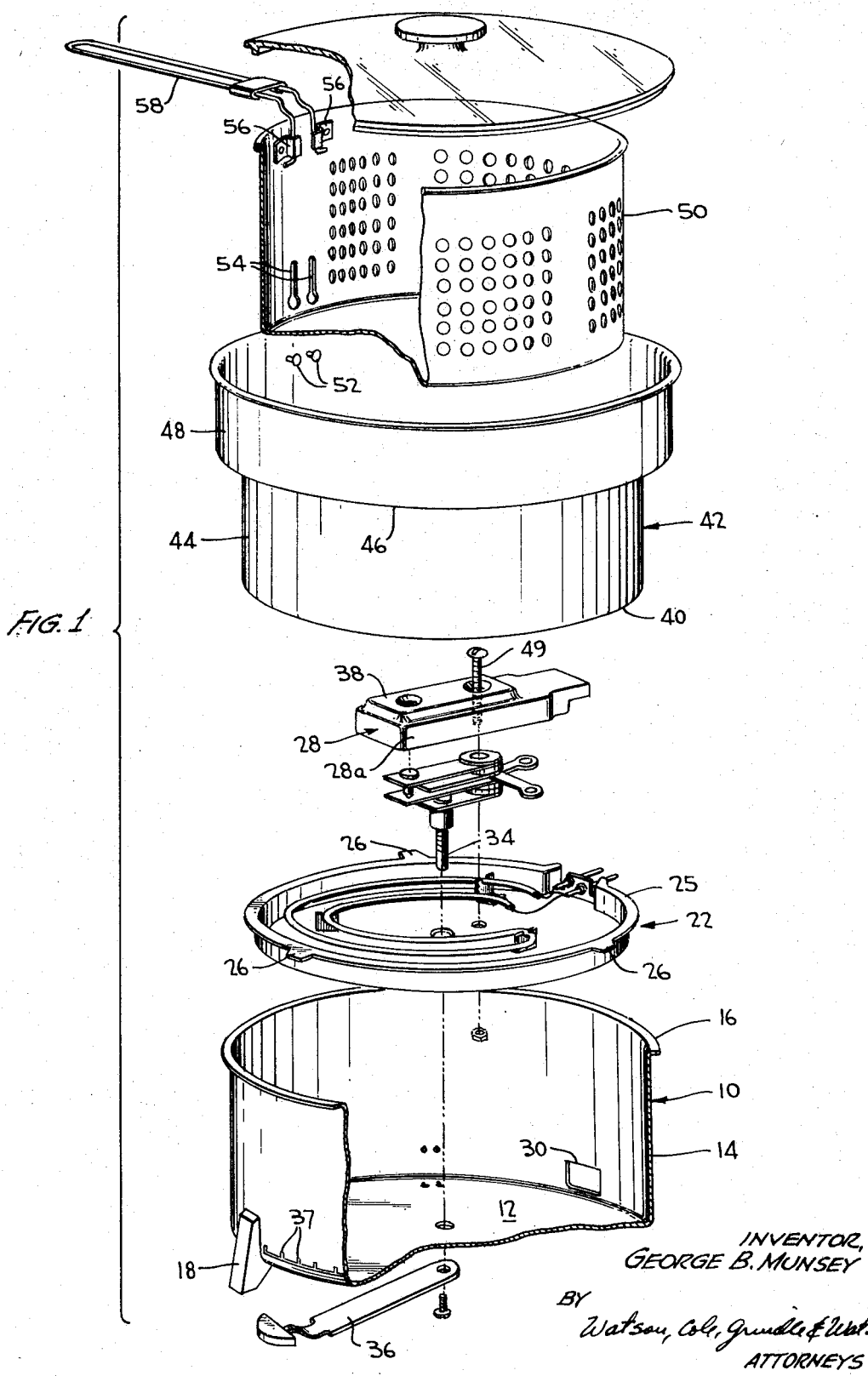
FIGURE 1 is an exploded elevational view of various parts of a cooking apparatus in accordance with the invention.
Figure 2:
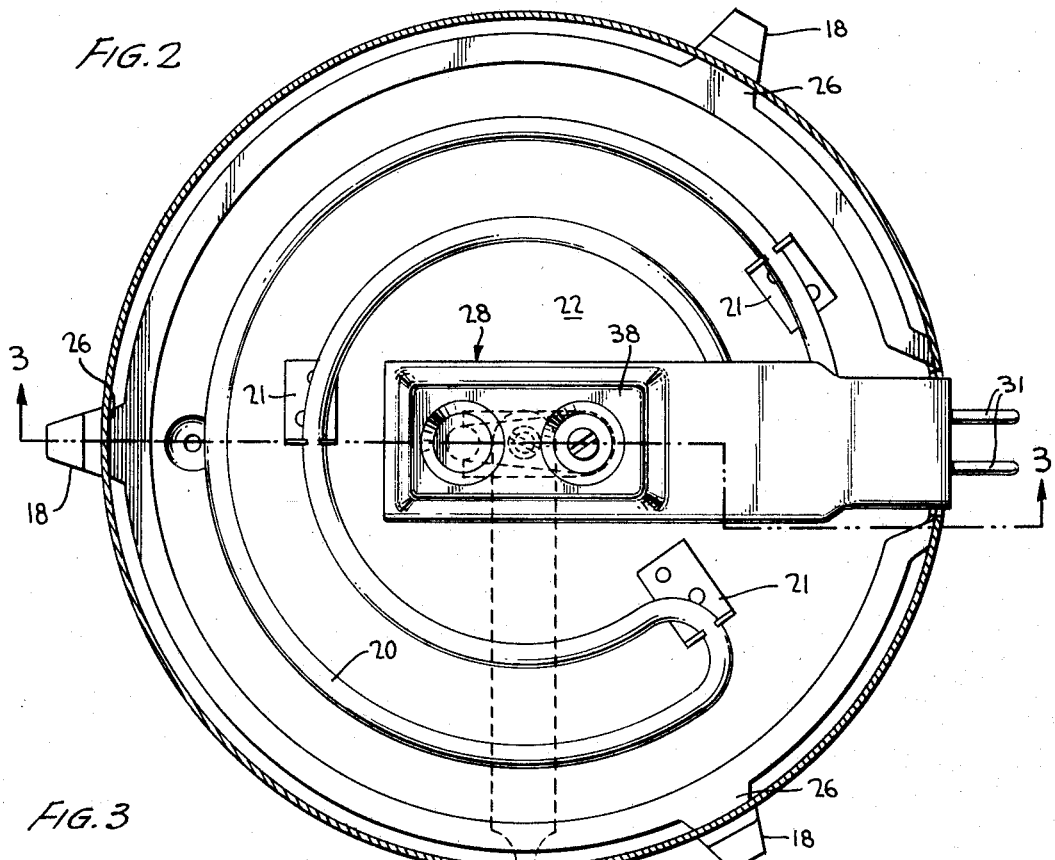
FIGURE 2 is a horizontal plan section through the receptacle, with the components assembled therein.

Referring now in detail to the accompanying drawings, the preferred embodiment of the invention, as shown therein, comprises a primary receptacle 10, preferably of suitable metal construction, having a generally horizontal bottom 12, here shown to be of circular configuration and an upstanding marginal wall 14, which may conveniently be cylindrical. The upper edge of the wall 14, conveniently assumes the form of a marginal flange 16 disposed in a horizontal plane and defining the mouth of the upwardly opening receptacle.

For supporting the receptacle on a table top or other horizontal surface, the receptacle is provided with a plurality of conventional supporting legs 18 preferably having insulating pads 19 thereon and adapted to support the receptacle with its bottom spaced above the supporting surface a sufficient distance to avoid risk of damage to the surface by radiated heat.

Supported within the receptacle, adjacent its bottom, is an electric heating element 20 which preferably is carried by brackets 21 on a conductive metal pan or heat shield 22. The shield 22, in turn, is supported in slightly spaced relation above and parallel to the receptacle bottom, as by a plurality of downwardly projecting bosses or indentations 23, to provide an insulating air space between the shield 22 and receptacle bottom.

Preferably the shield 22 includes an upstanding circular rim 25, having angularly spaced retainer tabs 26 diverging upwardly therefrom. The outer ends of these tabs normally lie on a circle of greater radius than the marginal wall 14 of the receptacle so as to be deflected inwardly by the wall, whereby their resilient restoring force engages their upper edges and corners with the wall to resist upward displacement of the shield 22.

The heating element 20 illustrated in the accompanying drawings is of a conventional electrical resistance type. In the arrangement here shown, the heating element 20 is arranged generally in the form of an incomplete annulus so as to define on one side thereof a gap through which extends a radially oriented switch housing 28. The inner end of the housing 28 is thus generally at the center of the annulus, while the radially outer end of the housing 28 extends through and is supported in an opening 30 through the marginal wall 14 of the receptacle. The terminal ends of the heating element 20 extend into the housing 28 for connection, in conventional manner, in an electrical circuit which includes the thermostatic switch hereinafter described, as well as the contacts or terminals 31 of an electrical coupling, the terminals 31, in this instance, being supported by and extending through the receptacle wall to the receptacle exterior, for cooperation with the female member of a conventional electrical socket.

Within the inner end portion of the housing 28, substantially at the center of the annular heating element 22, is a conventional bimetallic thermostatic switch 32 which also is connected in conventional manner in the electrical circuit through the heating element, to control the electrical energizing circuit for the heating element in accordance with variations in the temperature to which the thermostatic switch is subjected. It is to be noted that the housing 28 overlies the switch 32 and includes a depending skirt 28a which shields the switch from the heat radiated from the surrounding heating element 20. It will be appreciated that the terminal end portions of the heating element 20 within the housing are adjacent to the outer end thereof and are of such small extent and so distant from the switch that the radiant heat from these terminal end portions will be substantially insignificant, and in any event, insufficient to exert a controlling effect on the switch. Rather the disposition of the housing 28 is such as to cause the switch to respond directly to heat radiated to its temperature responsive elements from the surrounding housing 28.

In order to provide for adjustment of the operative temperature of the heating element, the thermostatic switch 32 is provided with a suitable rotary adjusting shaft 34, extending downwardly through central openings in the pan and receptacle bottoms. A radial adjusting arm 36 affixed to the lower end of this shaft 34, beneath the receptacle bottom, has an outer end projecting radially from beneath the bottom for manual angular adjustment between adjacent receptable legs 18. If desired, the cylindrical marginal wall of the receptacle may have disposed thereon suitable temperature calibrations 37 for cooperation with the arm 36 to facilitate positioning the arm accurately for maintaining the desired temperature of the container.

At a location immediately overlying the thermostatic switch 32, the housing 28 is formed to provide an upwardly presented contact surface 38 for heat conductive engagement with the bottom 40 of the container 42. The container bottom 40 and the upwardly presented heat transmitting contact surface 38 are conformed in any suitable manner for contiguous engagement with each other over a substantial area, whereby heat may be conducted from the container to the switch housing. The container bottom and switch housing are thus in intimate heat exchanging relationship. From the housing 28 the heat is radiated to the thermostatic switch enclosed therein to cause the thermostatic switch 32 to be controlled in direct response to variations in the temperature of the container 42.

In the embodiment here illustrated, the container or bowl 42 comprises an upstanding marginal wall 44 and a horizontal flange 46 which encircles and projects outwardly from the wall 44. It is important to note that the vertical distance between the flange 46 and the container bottom 40 is equal to the vertical distance between the heat transmitting surface 38 of the switch housing and the marginal flange 16 of the receptacle at its mouth.

The thermostatic switch 32 has its various components mounted on a bushing 47 which is interposed between the heat shield 22 and the contact surface portion 38 of the housing, to support the latter at a predetermined level in the receptacle. A threaded fastener 49 extends through the bushing, shield and housing, to firmly secure these components in position.

The container flange 46 engages the flange 16 of the receptacle around its entire periphery, to substantially seal or isolate the interior of the receptacle from the atmosphere. Preferably, the marginal wall 44 is substantially cylindrical and defines a lower portion of the container which is proportioned for reception within the receptacle. Desirably, the container also includes a preferably substantially cylindrical upper container portion 48 of greater diameter or horizontal dimension than the mouth 16 of the receptacle and the upper and lower container portions 46 and 44 are integrally interconnected by the flange 46.

In order to adapt the apparatus for selective use, either as a deep fat frier or simply as a kettle or the like, there is provided a perforated food basket 50, which is removably supported within the container, as by means of headed pins 52 within and connected to the marginal container wall for operative reception in bayonet slots 54 through the side wall of the basket. The basket is thus supported for ready removal within the container. To facilitate handling of the basket, there may be provided relatively opposed brackets 56 on the basket side wall for gripping reception of the resiliently spread ends of a U-shaped handle 58.

Figure 3:
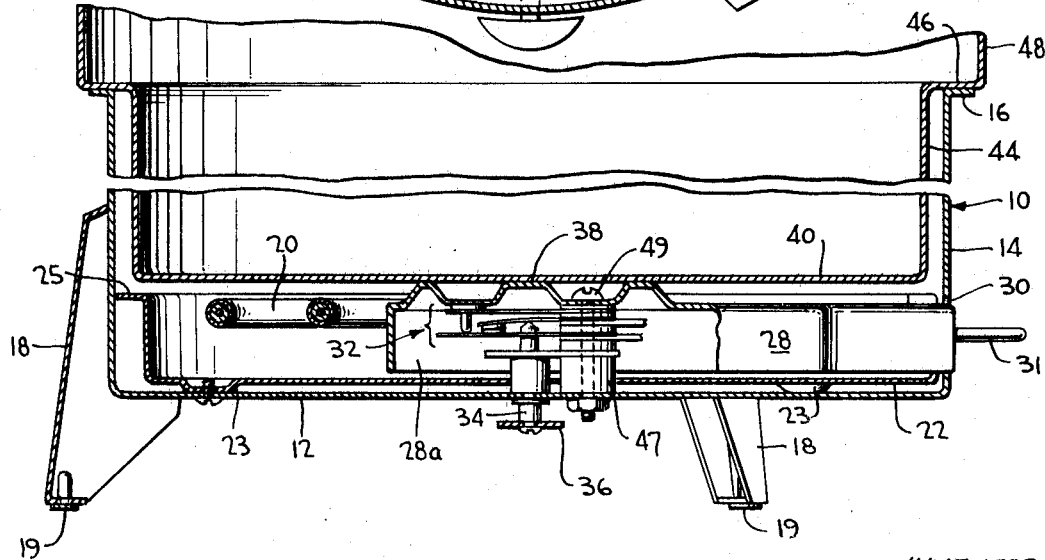
FIGURE 3 is a section on the line 3—3 of FIGURE 2.

In the operation of the invention as a deep fat frier, the container 42 is filled to a predetermined level with a suitable cooking oil or fat and inserted into operative position within the receptacle in the manner indicated in FIGURE 3 of the drawings. As thus positioned, the upper or supporting flange 46 of the container rests upon the upwardly directed flange 16 at the mouth of the receptacle 10, and together with the body of the container 42 functions to prevent communication between the interior of the receptacle and the atmosphere, thus preventing the escape from the receptacle of convection air currents, such as would result in loss of heat from the receptacle and instability of the temperature therein. At the same time, the bottom 40 of the container rests on and is in heat conductive engagement over a substantial area with the heat transmitting surface or surface portion 38 of the thermostatic switch housing, so that heat transmitted from the heating element 20 to the container 42 will be conducted through the container bottom 40 to the thermostat housing 28 whereby to cause the thermostat to control the flow of electricity through the heating element, primarily in response to variations in temperature of the container.

It will be readily apparent that in order to operate in this manner, it is necessary to have both a substantial sealing or closing engagement of the container with the mouth of the receptacle and also a heat conductive engagement between the container bottom and the thermostatic switch housing. In order to simultaneously achieve these two relationships, the container is so proportioned that the vertical distance between the lower surfaces of its bottom and its supporting horizontal flange is precisely equal to the vertical distance from the heat transmitting surface of the thermostatic switch housing to the upper surface of the supporting flange of the receptacle.

The arrangement is such that the apparatus herein described is capable of quite versatile usage. For instance, the perforated basket may be replaced by an imperforated auxiliary container, so that the device may be thus rendered capable of use in the manner of a conventional double boiler, in which the container itself is adapted to hold water, while the auxiliary container may contain the food to be prepared. Alternately, the basket may simply be omitted and the food to be cooked may be placed directly within the container.

An important advantage of the invention is that although the heating element is controlled by its thermostatic switch in direct response to variations in temperature of the container, the container is not permanently associated with either the heating element or switch, and is so arranged that it may be readily removed for washing.

Having thus described my invention, I claim:

1. Thermostatically controlled cooking apparatus comprising a receptacle having a generally horizontal bottom and an upstanding marginal wall encircling said bottom, said marginal wall having an upper edge in substantially a horizontal plane defining the mouth of the receptacle; an electrical heating element supported within the receptacle in substantially a horizontal plane; a thermostatic switch connected to said element to control the electrical circuit through said element, said switch including a housing of heat conductive material having an upwardly presented heat transmitting surface supported at a fixed level in said receptacle; a container of heat conductive material removably supported in said receptacle, said container having a heat conductive bottom in contiguous engagement over a substantial area with said heat transmitting surface of the thermostatic switch housing; said container comprising an upstanding marginal wall, and a horizontal flange encircling said wall, said flange engaging said upper edge of the marginal wall of the receptacle to substantially isolate the interior of the receptacle from the atmosphere, the vertical distance between the container bottom and its said flange being equal to the vertical distance between the heat transmitting surface of the switch housing and said upper edge of the receptacle.

2. Thermostatically controlled cooking apparatus, as defined in claim 1, in which said heating element is of generally annular configuration, and said thermostatic switch is centered with respect to said element.

3. Thermostatically controlled cooking apparatus, as defined in claim 1, in which said heating element is generally in the form of an incomplete annulus providing a gap in one side thereof, said housing extending through said gap with the inner end of the housing adjacent the center of the annulus, the outer end of said housing extending through an opening in said marginal wall of the receptacle to the exterior thereof.

4. Thermostatically controlled cooking apparatus as defined in claim 3, in which said thermostatic switch is located at the inner end of said housing.

5. Thermostatically controlled cooking apparatus as defined in claim 4, including electrical terminal members carried at the outer end of said housing in circuit with said heating element and said switch.

6. Thermostatically controlled cooking apparatus as defined in claim 1, in which said upstanding marginal wall of the container comprises a lower container portion proportioned for reception in said receptacle, and an upper container portion of greater horizontal dimensions than the mouth of the receptacle, said horizontal flange of the container interconnecting said upper and lower container portions, in combination with a perforated food basket and means for removably supporting said food basket within the container and above the container bottom.

7. Thermostatically controlled cooking apparatus as defined in claim 6, in which said upper and lower container portions are of generally cylindrical shape and said receptacle mouth and said horizontal flange of the container are of annular configuration.

8. Thermostatically controlled cooking apparatus as defined in claim 1, in which said receptacle bottom is circular and the marginal wall of the receptacle is generally cylindrical, said thermostatic switch being of the adjustable type, including a rotary vertical adjusting shaft depending concentrically through said bottom of the receptacle, and an actuating arm fixed on said shaft beneath the bottom for swinging movement parallel to the bottom, with the outer end of said arm movable in an arc beneath and adjacent the said marginal wall, and temperature calibrations disposed on said marginal wall for cooperation with the switch arm to facilitate positioning of said switch arm to regulate said thermostatic switch for obtaining the desired operating temperature of the heating element.

References Cited

UNITED STATES PATENTS

| | | | |
|---|---|---|---|
| 2,004,963 | 6/1935 | Scharf. | |
| 2,725,460 | 11/1955 | Braski et al. | 219—436 |
| 2,749,426 | 6/1956 | Schwaneke | 219—432 |
| 2,785,277 | 3/1957 | Jepson | 219—442 |
| 3,348,470 | 10/1967 | Swanson | 99—340 XR |

BILLY J. WILHITE, Primary Examiner

U.S. Cl. X.R.

99—340, 412; 219—432, 442, 436